A. J. BEJOT.
DRAFT APPLIANCE FOR HARVESTING MACHINERY.
APPLICATION FILED APR. 23, 1909.
934,880.
Patented Sept. 21, 1909.
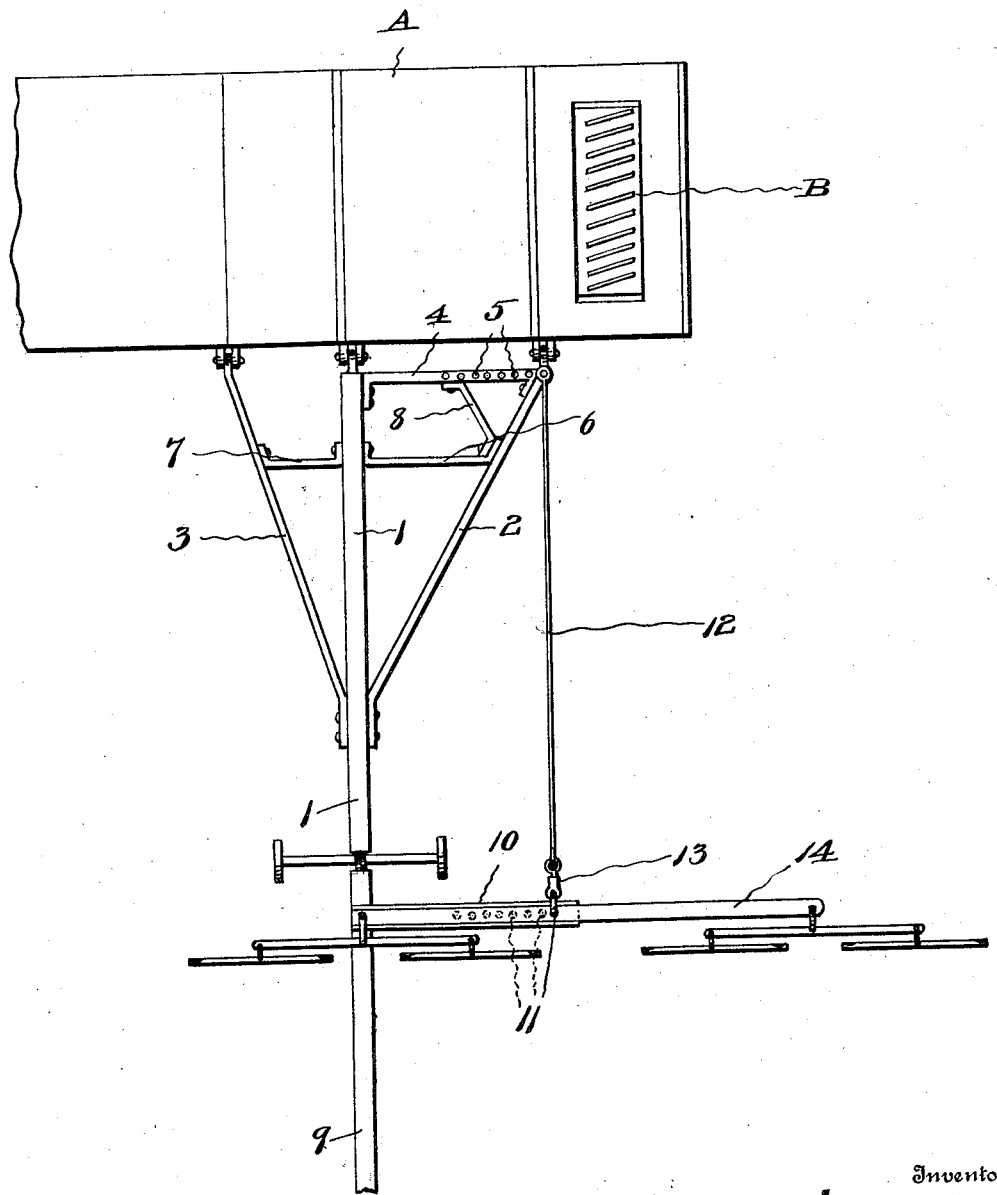

UNITED STATES PATENT OFFICE.

AMILE J. BEJOT, OF LONG PINE, NEBRASKA.

DRAFT APPLIANCE FOR HARVESTING MACHINERY.

934,880.  Specification of Letters Patent.  Patented Sept. 21, 1909.

Application filed April 23, 1909. Serial No. 491,792.

*To all whom it may concern:*

Be it known that I, AMILE J. BEJOT, a citizen of the United States, and a resident of Long Pine, in the county of Brown and State of Nebraska, have invented certain new and useful Improvements in Draft Appliances for Harvesting Machinery, of which the following is a specification.

My invention relates to draft appliances of farm machinery, such as grain-reapers, and has for its object the provision of a device that will eliminate side draft and consists in securing the draft-pole to the apex of a triangular frame having its base secured to the platform of the machine with one of its angles opposite to the center of draft and a bar extended laterally from the secured end of the pole with a rod connecting the base of the triangular frame and a clevis secured to the lateral bar, the draft-evener being also secured to said clevis. The base of the triangular frame and the bar are provided with a plurality of holes, so that the rod may be adjusted to suit the condition of the work, the weight of the grain, etc.

My invention will be described in detail hereinafter and illustrated in the accompanying drawings, in which the figure is a plan view of a harvesting machine platform, or a fragment thereof, showing my improved draft appliance attached thereto.

A indicates the platform of a harvesting machine having the bull-wheel B journaled thereon.

1 indicates a beam pivotally secured to the front of platform A, 2 and 3 cross-bars near the front end of beam 1 and extending rearwardly therefrom on acute angles thereto and also pivotally secured to the platform, the near end of bar 2 being secured to the platform opposite the center of draft of the machine. 4 indicates a cross-bar connecting the rear ends of beam 1 and bar 2, and having a series of holes 5 therein. 6 and 7 indicate braces conecting bars 2 and 3, respectively, and beam 1, and 8 a brace connecting bars 2 and 4.

It will be apparent from an inspection of the drawings that the beam 1 and bars 2, 3, and 4, together with the braces 6, 7, and 8, constitute a triangular frame.

9 indicates the draft-pole pivotally secured to the front end of beam 1 to swing in a vertical plane only and having a bar 10 extending laterally therefrom, with a plurality of holes 11 therein. 12 indicates a draft-rod secured in one of the holes 5 and to the clevis 13, secured in one of the holes 11. 14 indicates the draft-evener, also secured to clevis 13.

In use it will be understood that the draft is applied through the rod 12, which may be adjusted in holes 5 and 11 toward or away from the cutter-bar (not shown), so as to insure an even running of the machine and relieve the draft-animals from the side draft which is the objectionable feature of machines of the mower and reaper type where the pull of the work is necessarily at one side of the center of draft. In my device the rod 12 is so adjusted that the pull of the work is not at one side of the center of draft as in machines as at present constructed, but directly in the center of draft.

Having thus described my invention, what I claim is—

In combination with the platform of a harvesting-machine, a beam secured to the platform, bars secured near the front end of the beam and extending rearwardly at acute angles to the beam and secured to the platform, a cross-bar secured to the rear end of one of the bars aforesaid and the beam and having a series of holes therein, the draft-pole secured to the front end of the beam, a bar extended laterally from the secured end of the draft-pole in the same direction as the cross-bar aforesaid and having a series of holes therein, a clevis secured in one of the holes, in said lateral bar, the draft-evener secured to said clevis, and a draft-rod secured in one of the holes in the cross-bar aforesaid and to the clevis, substantially as shown and described.

In witness whereof, I have hereunto set my hand in presence of two subscribing witnesses.

AMILE J. BEJOT.

Witnesses:
 WM. M. ELY,
 C. A. BARNES.